(12) United States Patent
Alva et al.

(10) Patent No.: US 11,503,845 B2
(45) Date of Patent: Nov. 22, 2022

(54) PROCESSES AND DEVICES FOR FREEZING ORGANIC PRODUCTS

(71) Applicants: Junia Suresh Alva, Mumbai (IN); Vernon Ranier Alva, Mumbai (IN)

(72) Inventors: Junia Suresh Alva, Mumbai (IN); Vernon Ranier Alva, Mumbai (IN)

( * ) Notice: Subject to any disclaimer, the term of this patent is extended or adjusted under 35 U.S.C. 154(b) by 0 days.

(21) Appl. No.: 16/475,447

(22) PCT Filed: Feb. 5, 2019

(86) PCT No.: PCT/IN2019/050086
§ 371 (c)(1),
(2) Date: Jul. 2, 2019

(87) PCT Pub. No.: WO2020/152695
PCT Pub. Date: Jul. 30, 2020

(65) Prior Publication Data
US 2021/0337836 A1    Nov. 4, 2021

(30) Foreign Application Priority Data
Jan. 22, 2019 (IN) .............................. 201921002692

(51) Int. Cl.
*A23L 3/375* (2006.01)
*F25D 3/10* (2006.01)
*F25D 17/02* (2006.01)

(52) U.S. Cl.
CPC .............. *A23L 3/375* (2013.01); *F25D 3/102* (2013.01); *F25D 17/02* (2013.01); *F25D 2201/126* (2013.01); *F25D 2303/085* (2013.01)

(58) Field of Classification Search
CPC ......... A23L 3/375; F25D 3/102; F25D 17/02; F25D 2201/126; F25D 2303/085
(Continued)

(56) References Cited

U.S. PATENT DOCUMENTS 3,440,831 A * 4/1969 Thompson .............. F25D 9/005
62/63
4,715,195 A * 12/1987 Kucza ................... F25D 31/007
62/438
(Continued)

FOREIGN PATENT DOCUMENTS

CA          964921 A1    3/1975
CN          1086802 C    6/2002
(Continued)

OTHER PUBLICATIONS

International Search Report and Written Opinion received for PCT Patent Application No. PCT/IN2019/050086, dated Mar. 11, 2019, 09 pages.

*Primary Examiner* — Steve S Tanenbaum
(74) *Attorney, Agent, or Firm* — Scott D. Swanson; Shaver & Swanson, LLP (57) ABSTRACT

The invention relates to a process of freezing an organic product using a freezing device. The process includes introducing an organic product inside a tank of the freezing device containing a freezing solvent set to a predefined temperature. The freezing solvent is an alcohol/aqueous based solution including at least one inhibitor. Nitrogen is passed in a form of bubbles into the freezing solvent through a gas permeable structure placed inside the tank. The freezing solvent is circulated from the tank, through a liquid transmission means and back into the tank using a pump to maintain the freezing solvent at the predefined temperature. The freezing solvent is agitated using at least one agitator placed within the tank. The steps of passing nitrogen, circulating and agitating the freezing solvent are performed until a core temperature of the organic product reaches the predefined temperature.

22 Claims, 7 Drawing Sheets

(58) Field of Classification Search
USPC .............................................................. 62/62
See application file for complete search history.

(56) References Cited

U.S. PATENT DOCUMENTS

| | | | |
|---|---|---|---|
| 2008/0216673 A1* | 9/2008 | Takenaka | ................. A23L 3/365 |
| | | | 99/451 |
| 2011/0179812 A1* | 7/2011 | Goldstein | ............... F25D 3/045 |
| | | | 62/62 |
| 2015/0144206 A1* | 5/2015 | Dickinson | ............. F24H 9/2028 |
| | | | 137/565.17 |

FOREIGN PATENT DOCUMENTS

| | | |
|---|---|---|
| FR | 2023825 A1 | 8/1970 |
| GB | 1385717 A | 2/1975 |
| WO | WO2012091964 A1 | 7/2012 |

\* cited by examiner

PROCESSES AND DEVICES FOR FREEZING ORGANIC PRODUCTS

FIELD OF THE INVENTION

The present invention relates generally to preservation of organic products. More particularly the present invention relates to processes and devices for freezing organic products into refreshable frozen products.

BACKGROUND OF THE INVENTION

Freezing of organic products (e.g. food products) is one of the primary processes involved in preservation of products. Freezing as a method of preservation is practiced with a view to increase a shelf life and maintain an overall quality of the organic/biodegradable products over extended time periods. While current techniques of freezing do increase the shelf life of the organic products by a couple of months, they have known to result in deterioration of quality in the frozen products by way of freezer burns.

Freezer burn is a condition that occurs in frozen products, when water molecules present within the frozen products undergo sublimation. Generally, water molecules in a frozen product placed in a freezing environment (e.g. a freezer) vibrate and migrate towards a surface of the product, from where they escape into air by sublimation. Due to such migration of the water molecules, various portions (e.g. inner portions) of the frozen product undergo dehydration and appear shriveled/burnt after a period of time.

Further, fluctuations in temperature within the freezing environment cause an onset of the freezer burn, as temperature gradients between the product and air of the freezing environment create an additional impetus for water molecules to move from their original positions. Hence, some prior art techniques that use flow of cold air for freezing, (e.g. blast freezers that use blower fans to force cold air across the contents of the freezer to cause rapid freezing) often have fluctuations in temperature within the freezing environment that result in freezer burns on the frozen products.

Further, use of cold air flow at temperatures of −20 to −40 degree Celsius, have known to cause uneven freezing of products, as the cold air fails to come into contact with various portions of the products (e.g. inner portions and a bottom surface of the product). Such uneven freezing of products, is also a cause for the water molecules to move from their original positions during freezing, and thereby causing drip loss in the products during defrosting.

To overcome the drawbacks as aforementioned, there is a need for an improved process and device for thawing organic products. The improved method must freeze the organic products such as to avoid/curb deterioration in quality and freezer burns. Further, the improved method must ensure uniform freezing of the products in order to avoid drip loss. Accordingly, an alternate process and device for freezing organic products is disclosed.

SUMMARY OF THE INVENTION

An aspect of the invention provides a process for freezing an organic product using a freezing device. Disclosed process freezes the organic product to a predefined temperature ranging from −40 to −195 degree Celsius. The freezing device comprises a tank that contains a freezing solvent, in which the organic product is immersed during the freezing process. In an embodiment, the freezing tank is a double walled tank insulated with a semi rigid foam material (e.g. polyurethane foam). Further, the freezing solvent is set and maintained to a predefined temperature by a cooling unit (e.g. cooling coils that circulate a refrigerant) that is coupled to the tank. Furthermore, the freezing solvent is set to the predefined temperature by passing nitrogen in one of a gaseous and a liquid form through at least one inlet port of the tank into the freezing solvent to bring the temperature of the freezing solvent to the predefined temperature, prior to introducing the organic product into the freezing tank.

The process includes, introducing the organic product inside the tank of the freezing device, where the organic product is at a temperature higher than the predefined temperature. In an embodiment, the freezing solvent is at least one of an alcohol based solution and an aqueous solution comprising at least one inhibitor. In an embodiment, the freezing solvent is a dehydrated ethanol solution having a low surface tension. In an embodiment, the at least one inhibitor is selected from a group of non-ionic surfactants, and antifreeze additives. The non-ionic surfactants are used for maintaining the nitrogen in a form of bubbles in the solution. The antifreeze additives are required to lower a freezing point of freezing solvent to below −195 degree Celsius, so that the freezing solvent remains in a liquid and stable state when required to freeze the organic product up to a minimum predefined temperature of −195 degree Celsius. For example, in a freezing solvent comprising an aqueous solution of ethanol, the at least one inhibitor is selected from Polysorbate 80, monoacyl glycerol, octyl glucoside sodium chloride (NaCl), and/or calcium chloride (CaCl).

In an embodiment, introducing the organic product inside the tank includes, placing one or more samples of the organic product on an arrangement of shelves, and lowering the arrangement of shelves through at least one access means into the tank. In an embodiment, the at least one access means, is an opening provided in a top portion of the tank, that is closed by a lid. The lid can be slid open, for introducing the organic product inside the tank. Further, in an embodiment, each sample that is placed on a shelf is spaced at a predefined distance from another sample on the shelf. In an embodiment, each shelf is provided with a plurality of holes to facilitate flow of the freezing solvent onto a sample placed on the each shelf.

The process further includes, passing nitrogen in form of bubbles into the freezing solvent by using a gas permeable structure placed inside the tank, wherein nitrogen is provided to the gas permeable structure in one or more of a gaseous form, a liquid form, and a combination thereof through the at least one inlet port of the tank, wherein a form of the nitrogen is selected based on the predefined temperature. For example, the nitrogen is provided in the liquid form when the temperature of the liquid and the predefined temperature is in a range of −160 to −195 degree Celsius, and wherein the nitrogen is provided in the gaseous form when the temperature of the liquid and the predefined temperature is in a range of −40 to −160 degree Celsius.

The gas permeable structure is selected from a group consisting of a bubble generator, a nano membrane, and a sparger based on a form of nitrogen provided through the at least one inlet port. For example, gaseous nitrogen is passed to the bubble generator, and liquid nitrogen is passed to the sparger (e.g. a sintered sparger having pores of size of 0.1 micron). The bubbles generated by the gas permeable structure are of size of 0.1 micron. Generation of bubbles of nitrogen in the freezing solvent facilitate uniform reduction in the temperature of the freezing solvent and consequently uniform cooling of the organic product.

The process further includes, circulating the freezing solvent from the tank, through a liquid transmission means and back into the tank using a pump to maintain the freezing solvent at the predefined temperature. In an embodiment, the liquid transmission means and the pump are coupled externally to the freezing tank.

The freezing solvent is agitated using at least one agitator placed within the tank to break one or more layers of heat surrounding the organic product. The agitator is selected from the group consisting of fan, screw-type and helical agitators. Further, a speed of the agitator, is selected based on a viscosity of the freezing solvent, and wherein the speed is selected in a range of 1 to 500 rpm. In an embodiment, a controller may operate the speed of the agitator. In another embodiment, the speed of the agitator can be manually set to a desired level.

The method further includes, performing the steps of agitating, passing nitrogen, and circulating the freezing solvent until a core temperature of the organic product reaches the predefined temperature. In an embodiment, a sample of the organic product containing a temperature probe is immersed into the freezing solvent. The temperature probe is communicatively coupled to a display unit, to display a core temperature of the sample, as measured by the temperature probe. As the sample is placed in the same freezing solvent, the temperature displayed corresponds to the core temperature of the organic product. Hence, when the displayed temperature reaches the predefined temperature, the steps of agitating, passing nitrogen, and circulation of the freezing solvent is ceased, and the organic product is removed from the tank.

In an embodiment, the method includes, isolating the organic product from the freezing solvent by sealing the organic product in at least one of a gas permeable bag and a high bather bag. The high bather bag (e.g. a nylon bag) is a non-permeable bag that prevents oxygen and/or air from passing through. For example, the organic product can be vacuum-sealed in a gas permeable bag first, and can then be vacuum-sealed again with the high barrier bag. The double packing ensures the freezing solvent does not come in contact with the organic product. As a result, any deterioration of the organic product that may occur due to interaction with the freezing solvent and additives used during the freezing process is eliminated.

In an embodiment, the organic product is selected from the group consisting of fish, meat, vegetables, fruits, roots, seeds, microbes, fungi and blood plasma. For example, the organic product is a fish fillet that is subjected to the freezing process in a fish processing plant. Further, the predefined temperature of the organic product sample is selected based on water and a fat content of the organic product. In an embodiment, the predefined temperature is selectable from −40 to −195 degree Celsius.

Another aspect of the invention provides a freezing device to freeze an organic product. The freezing device includes, a tank having at least one access means through which the organic product is introduced into the tank. The at least one access means is adapted to be opened for introducing the organic product, and is closed thereupon. In an embodiment, the access means is a closeable opening provided at a top of the tank, wherein the access means is adapted to be closed by sliding a sealable lid such as to cover the access means completely. Similarly, the access means is adapted to be opened by sliding the sealable lid into an open position that exposes the inside of the tank through the access means.

The tank is an enclosed structure that contains a freezing solvent used for freezing the organic products, where the freezing solvent is maintained at a predefined temperature. In an embodiment, the freezing solvent is at least one of an alcohol-based solution, and an aqueous solution comprising at least one inhibitor selected from a group consisting of Polysorbate 80, monoacyl glycerol, octyl glucoside sodium chloride (NaCl), and calcium chloride (CaCl). In the embodiment, the ratio of the alcohol to the at least one inhibitor is 10:1.

At least one inlet valve is provided within an inlet of the tank to pass the freezing solvent inside the tank, at least one outlet valve provided within an outlet of the tank to eject the freezing solvent from the tank, and at least one liquid transmission means coupled to a pump is provided to circulate a stream of the freezing solvent between an inlet valve and an outlet valve. In an embodiment, the inlet valve, the outlet valve and the pump are electromechanically operated by a controller, to circulate the freezing solvent at a flow rate based on a viscosity of the freezing solvent.

Further, the freezing device includes at least one agitator, suspended inside the freezing solvent, and adapted to rotate for agitating the freezing solvent and breaking layers of heat around the organic product. A gas permeable structure is placed inside the tank to pass nitrogen in form of bubbles into the freezing solvent. In an embodiment, the gas permeable structure is coupled to at least one inlet port of the tank and receives nitrogen in one of a gaseous form and a liquid form, wherein the at least one inlet port is connected to a reservoir that stores nitrogen.

In an embodiment, the freezing device includes a controller to operate the pump to circulate the freezing solvent from the at least one inlet, through the at least one liquid transmission means to the at least one outlet. Further, the controller controls an opening of the at least one inlet port to facilitate a flow of nitrogen in one of a gaseous and a liquid form to the gas permeable structure, based on a temperature of the freezing solvent and the predefined temperature. The controller is also configured to operate the at least one agitator at a predefined speed. In an embodiment, the controller selects the predefined speed based on a viscosity of the freezing solvent, and wherein the predefined speed is selected in a range of 1 to 500 rotations per minute (rpm).

In an embodiment, the controller is configured to open an inlet port to facilitate the flow of the nitrogen in the liquid form when the temperature of the liquid and the predefined temperature is in a range of −100 to −195 degree Celsius, and wherein the controller to open another inlet port to facilitate the flow of nitrogen in the gaseous form when the temperature of the liquid and the predefined temperature is in a range of −40 to −100 degree Celsius.

In an embodiment, the freezing device includes, an arrangement of shelves placed inside the tank for accommodating one or more samples of the organic product. In an embodiment, a spacing between one or more shelves is adapted to shift using an adjusting means based on a size of the one or more samples. Further, each shelf is provided with a plurality of holes to facilitate flow of the freezing solvent onto a sample placed on the each shelf.

In an embodiment, the freezing device includes, a displaceable carriage arrangement comprising a plurality of carriages connected to each other using a metal wire, and a pair of rails for transferring the plurality of carriages in and out of the tank through the at least one access means. In an embodiment, each carriage includes at least one shelf for accommodating one or more samples of the organic product. Further, the displaceable carriage arrangement is placed inside the tank.

In an embodiment, the tank is a double walled tank comprising an inner wall and an outer wall, wherein an inner wall is surrounded with cooling coils adapted to circulate a refrigerant to maintain a space contained by the inner wall at the predefined temperature. As the freezing solvent is contained in the space, the freezing solvent is maintained at the predefined temperature by the cooling coils. Further, the double walled tank is insulated with a semi rigid foam material disposed between the inner wall and an outer wall. In an embodiment, the inner wall and the outer wall are made of at least one of a metallic material and a moldable material.

DETAILED DESCRIPTION

The present invention is related to a process and device for freezing of organic products at low temperatures in a relatively short span of time in comparison to prior art techniques. The organic products include but are not limited to fish, meat, vegetables, fruits, roots, seeds, microbes, fungi, blood plasma and other biodegradable products. The present invention discloses a freezing device used for freezing organic products to a temperature range of −40 to −195 degree Celsius. Various embodiment, of the present invention can be practiced using a freezing device illustrated in FIG. 1.

Figure 1:
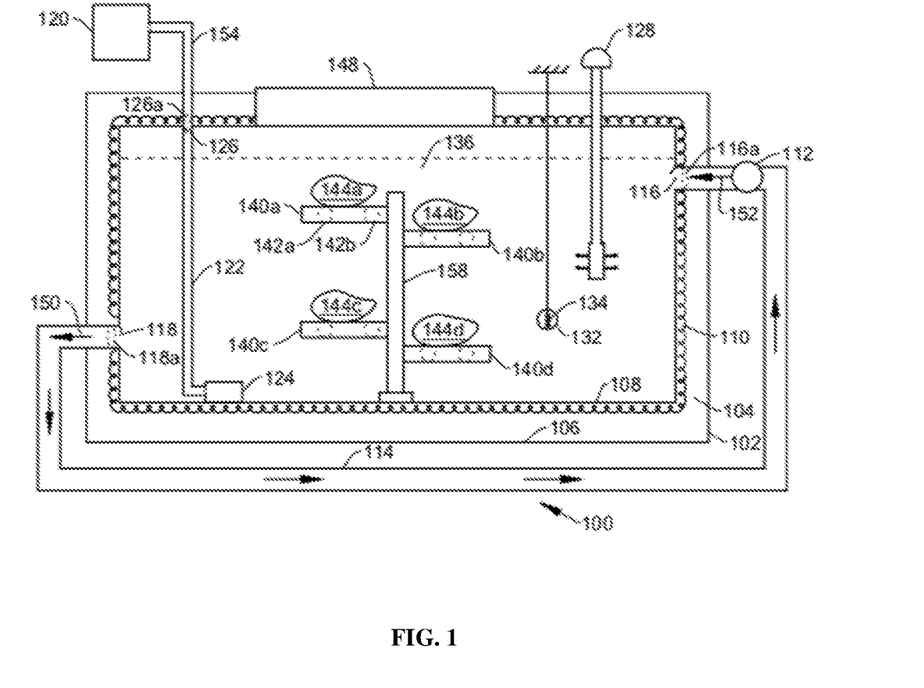
FIG. 1 is a block diagram of a freezing device used for freezing an organic product, in accordance with an embodiment of the present invention.

FIG. 1 is a block diagram 100 illustrating various components of a freezing device 100, used for freezing an organic product (e.g. 144a), in accordance with an embodiment of the present invention. As shown in FIG. 1, the freezing device includes a tank 102, at least one access means 148, a semi rigid foam material 104, a cooling unit 110, an inlet 116, a liquid transmission means 114, a pump 112, an outlet 118, a reservoir 120, a pipe 122, an inlet port 126, a gas permeable structure 124, an agitator 128, a temperature probe 134, a freezing solvent 136, and an arrangement of shelves 138.

The tank is a double walled tank having an inner wall 108, and an outer wall 106. The inner wall and the outer wall are made of a metallic material and/or a moldable material. As shown the inner wall is surrounded with the cooling unit 110. In an embodiment, the cooling unit 110 includes conduction coils that circulate a refrigerant to maintain a space contained by the inner wall at a predefined temperature. As the freezing solvent 136 is contained in the space, accordingly, a temperature of the freezing solvent is brought up to the predefined temperature. The predefined temperature is selected based on water and fat content of the organic product to be subjected to the freezing in the tank. For example, in case the organic product is a fish fillet, a plurality of parameters such as a thickness, a water content, a density and a fat content of the fish fillet determine the predefined temperature. Some fishes have high fat content, in order to avoid rancidity in such fatty fishes it is essential that we freeze them to lower temperatures. The predefined temperature is selectable from −40 to −195 degree Celsius.

Additionally nitrogen is passed, prior to introducing the organic product into the freezing tank, to aid in reducing a temperature of the freezing solvent to the predefined temperature. The nitrogen is passed in one of a gaseous and a liquid form through at least one inlet port (e.g. the inlet port 126) of the tank into the freezing solvent.

Further, the double walled tank is insulated with a semi rigid material 104 that is disposed in a space between the inner wall and an outer wall. In an example, the semi rigid material is a foam material such as polyurethane foam (PUF) of thickness 200 millimeter (mm). The insulation further aids in maintaining the freezing solvent at the predefined temperature, by preventing external atmospheric temperature from influencing the temperature of the freezing solvent.

The tank is provided with at least one access means, through which the organic product (144) is introduced inside the tank. An access means 148 is provided at a top part of the tank. In an embodiment, the access means is a closeable opening provided at a top portion of the tank. In an embodiment, the access means is adapted to be closed by sliding a sealable lid in a manner that covers the access means completely, and the access means is adapted to be opened by sliding the sealable lid into an open position that exposes the inside of the tank through the access means. For example, the access means is a door or a lid that can be opened when the organic product is to be introduced, and can be closed thereupon.

The organic product may be accommodated on an arrangement of shelves 138 as shown, in FIG. 1. The arrangement of shelves includes a plurality of shelves 140a-d, arranged on a metal frame 158. Each shelf can accommodate organic products (e.g. shelves 140a-d accommodate samples 144a-d of the organic product respectively). In an embodiment, each sample on a shelf is spaced at a predefined distance from another sample on the shelf.

Figure 2:
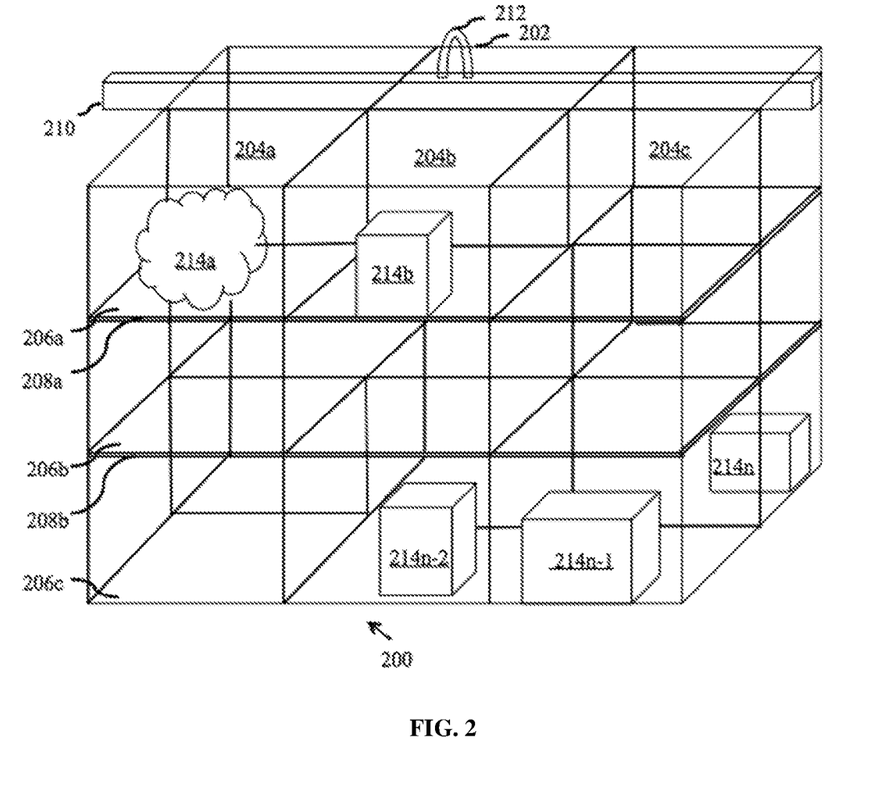
FIG. 2 is a perspective view of a meshed arrangement, accommodating a plurality of samples of an organic product, in accordance with an embodiment of the present invention.

Further, each shelf may be provided with holes/or may be meshed (as shown in FIG. 2)) to facilitate flow of the freezing solvent onto the organic product that is placed on the shelf. For example, shelf 140a has inbuilt holes 142a-b, that permit flow of the freeing solvent onto the organic product 144 and thereby facilitate in cooling each surface of the organic product 144. Further, a spacing between one or more shelves is adjustable using an adjusting means based on a size of the one or more samples. For example, a space between shelf 140a and 140c, is adjusted based on a size of sample 144c. In an embodiment, the shelves are movable along the metal frame 158, and can be affixed at a position on the metal frame by a nut and bolt arrangement.

In an embodiment, the arrangement of shelves can be lowered into the tank, through the access means 148 by a pulley arrangement (not shown). Upon completion of the freezing of the organic product, the access means is opened, and the pulley arrangement pulls the arrangement of shelves out of the tank. In an embodiment, the pulley arrangement may lock on to a hook (not shown) provided on the metal frame.

Further, the tank is provided with at least one inlet and at least one outlet for facilitating circulation of the freezing solvent during the freezing process. In an embodiment, the inlet 116 is provided, as shown, to permit the freezing solvent to flow inside the tank (as depicted by arrow 152). An electromechanical valve 116a is provided within the inlet 116 to control an opening of the inlet for permitting flow of the freezing solvent inside the tank.

In the embodiment, the outlet (118) is provided to the tank to permit the freezing solvent to flow out of the tank, during the circulation. The outlet 118 is provided with an electromechanical valve 118a, that controls the flow of the freezing solvent through the outlet. In an embodiment, a controller (not shown) communicatively coupled to one or more electromechanical valves provided within the at least one inlet and the at least one outlet controls an opening of the at least one inlet and the at least one outlet respectively to permit flow of the freezing solvent. For example, the controller can control opening of the electromechanical valves 116a, and 118a, to determine a rate of flow of the freezing solvent.

Further, the freezing device includes at least one liquid transmission means (e.g. a pipe or a metal conduit) that is coupled to a pump to circulate a stream of the freezing solvent between the at least one inlet and at least one outlet of the tank. For example, the liquid transmission means 114 is coupled between the outlet 118 and the inlet 116, to facilitate circulation of the freezing solvent from the outlet 118 to the inlet 116. The liquid transmission means is coupled to a pump (e.g. an electromechanical pump) that pumps the freezing solvent at predefined rate for the circulation.

The freezing device further includes at least one agitator, suspended inside the freezing solvent, and adapted to rotate for agitating the freezing solvent. In an embodiment, a single agitator (e.g. 128) as shown is suspended within the freezing solvent. The agitation of the freezing solvent is required to break one or more layers of heat that envelop/surround the organic product. Breaking of the layers of heat is essential, to facilitate the process of freezing the organic product. In an embodiment, the at least one agitator is selected from the group consisting of fan, screw-type and helical agitators. The at least one agitator is made to rotate at a predefined speed based on a viscosity of the freezing solvent. Typically, the predefined speed is selected in a range of 1 to 500 rotations per minute (rpm). In an embodiment, the controller as aforementioned, is configured to select the predefined speed, and control a speed of operation of the at least one agitator during the process of freezing. Alternatively, the at least one agitator is operated and the predefined speed is selected via a manually operated switch.

Further, the freezing device includes the gas permeable structure 124 that is placed inside the tank to pass nitrogen in a form of bubbles into the freezing solvent. In an embodiment, a size of the bubbles of nitrogen generated by the gas permeable structure is in a range of 0.05 to 0.1 micron. The gas permeable structure receives the nitrogen from at least one inlet port of the tank. Nitrogen is received at the at least one inlet port in a gaseous form, a liquid form or a combination thereof from a reservoir 120 (e.g. a cylinder) that stores nitrogen. The gas permeable structure is selected from a group consisting of a bubble generator, a nano membrane, and a sparger based on the form of nitrogen received at the at least one inlet port 126. Incase nitrogen is received in the liquid form, a sintered sparger is used as the gas permeable structure 124. Alternatively, if the nitrogen is passed in the gaseous form, a bubble generator is used as the gas permeable structure 124. In case a combination of gaseous form and a liquid form of nitrogen is required to be passed, one reservoir containing liquid nitrogen is provided that is connected to an inlet port via a pipe to pass liquid nitrogen to a sintered sparger, and another reservoir containing gaseous nitrogen is provided that is connected to another inlet port via another pipe to pass gaseous nitrogen to a bubble generator. Alternatively, gaseous nitrogen and liquid nitrogen can be filled into one reservoir, and an outlet can be provided at a top portion of the reservoir to release gaseous nitrogen into a first pipe that is connected to the at least one inlet port, and another outlet can be provided at a bottom portion of the reservoir to release liquid nitrogen into a second pipe that is connected to the at least one inlet port. The first pipe and the second pipe can be connected to the inlet port via a Y-shaped connector pipe. By using the aforesaid arrangements, a combination of gaseous and liquid nitrogen is passed into the reservoir.

As shown, the inlet port 126 receives the nitrogen from the reservoir 120 via a pipe 154. A valve 126a provided within the inlet port 126 controls an opening of the inlet port 126 for passing nitrogen to a pipe 122 that connects to the gas permeable structure 124. In an embodiment, the controller communicatively coupled to the valve 126a, provides a control signal to open and close the valve 126a. The valve 126a is opened to pass the nitrogen through the inlet port 126, and is closed when nitrogen is not required. Generally, a requirement for nitrogen in the freezing process, ceases when the temperature of the freezing solvent reaches the predefined temperature, or when the freezing process is complete. In an embodiment, a temperature probe (not shown) may be placed inside/suspended within the freezing solvent to measure the temperature of the freezing solvent, and communicate the temperature to the controller. Upon receiving the temperature of the freezing solvent, the controller may provide the control signal to open or close a valve of the at least one inlet port (e.g. 126a).

In an embodiment, the controller to operate the pump, control the opening of the at least one inlet and the at least one outlet using the one or more electromechanical valves, control the opening of the at least one inlet port to facilitate a flow of nitrogen and operate the at least one agitator at the predefined speed, until a core temperature of the organic product reaches the predefined temperature. The core temperature is defined as a temperature of a core region of the organic product. The freezing process is said to be complete, when the core temperature of the organic product reaches the predefined temperature.

In an embodiment, a sample 132 containing the temperature probe 134 is suspended with a wire 130 into the freezing solvent. The sample is made of the same material as the organic product. The temperature probe measures a core temperature of the sample and provides it to the controller and/or a display unit communicatively coupled to the temperature probe. For example, the temperature probe is a wireless temperature sensor that communicates wirelessly to the display unit. Typically, the core temperature of the sample corresponds to the core temperature of the organic product, as both are made of the same material and are subjected to the same freezing environment.

Hence, when the core temperature of the sample reaches the predefined temperature, the controller provides control signals to close the pump, the at least one inlet and the at least one outlet to cease circulation of the freezing solvent.

Further the controller closes the at least one inlet port to cease passing of nitrogen, and stops rotation of the agitator. Further, the controller may provide signals to open the access means to facilitate removal of the organic product from the tank. In an embodiment, the controller provides control signals to the pulley arrangement to lift the arrangement of shelves, accommodating the organic product, out of the tank. In an embodiment, the arrangement of shelves is a meshed arrangement as shown in FIG. 2.

FIG. 2 is a perspective view 200 of a meshed arrangement 202, accommodating a plurality of samples of an organic product 214a-n, in accordance with an embodiment of the present invention. In an embodiment, the meshed arrangement is made of metal wires. As shown, the meshed arrangement 200 has a plurality of shelves 206a-c, on which one or more samples of the organic product can be placed. Each shelf is supported with metal rods. For example, shelf 206a is supported with a metal rod 208a. Further, each shelf is divided into a plurality of cells. For example, shelf 206a is divided into cells 204a-c. In an embodiment, each cell accommodates one sample of the organic product, to ensure a predefined space between any two samples. A perspective view of a cell is shown in FIG. 3

Figure 3:
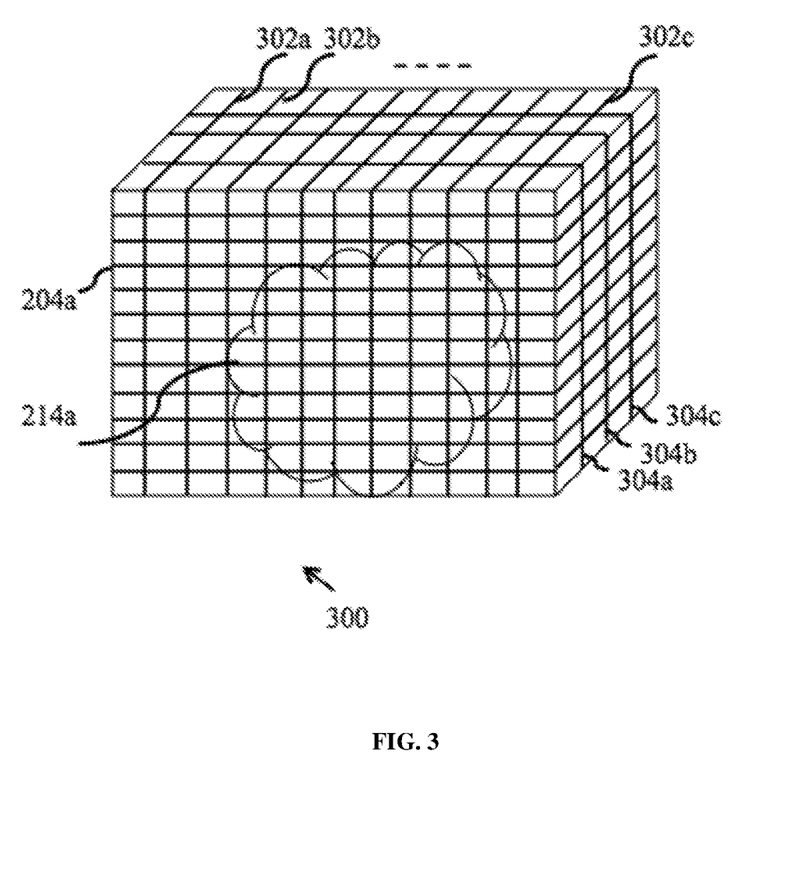
FIG. 3 is a perspective view of a cell in the meshed arrangement of FIG. 2, in accordance with an embodiment of the present invention.

FIG. 3 is a perspective view 300 of the cell 204a of the meshed arrangement 200, in accordance with an embodiment of the present invention. The cell 204a, is made of meshed wires 302a-c, and 304a-c. The sample 214a of the organic product is placed in an inner space of the cell enclosed by the meshed wires.

Further, the meshed arrangement is provided with a lifting bar 210 on a top portion that can be coupled to the pulley arrangement via a hook 212 attached to the lifting bar. In an embodiment, a hook of the pulley arrangement locks onto the hook 212, for moving the meshed arrangement in and out of the tank.

Figure 6:
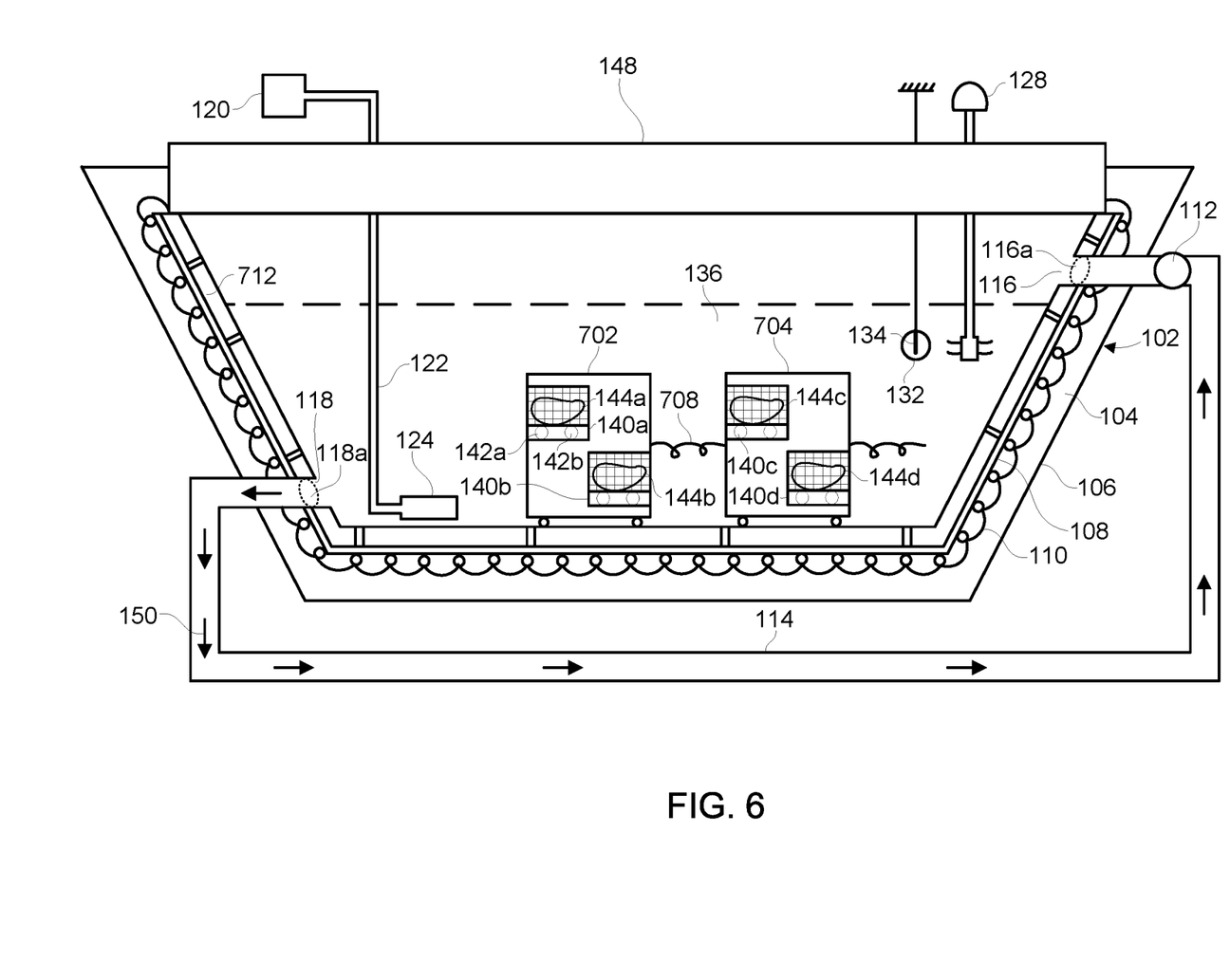
FIG. 6 is a block diagram illustrating a displaceable carriage arrangement in a freezing device used for freezing an organic product, in accordance with an embodiment of the present invention.

In another embodiment, as shown in FIG. 6, the one or more samples of the organic product can be accommodated in a displaceable carriage arrangement. The carriage arrangement includes a plurality of carriages (702,704) connected to each other using a metal wire (708), and a pair of rails (712) for transferring the plurality of carriages in and out of the tank through the at least one access means (148). Each carriage comprises at least one shelf (140a-b, 140c-d) for accommodating samples (144a-d) of the organic product, and is filled with freezing solvent (136). A carriage is introduced into the tank via an access means (148), and the process of freezing continues until a core temperature of each sample (144a-d) accommodated within the carriage reaches the predefined temperature. A sample organic product having a temperature probe (134) inserted inside it, is placed/suspended within the carriage to provide a measure of its core temperature to the controller. The core temperature of the sample (132), corresponds to the core temperature of the each sample. Hence, when the core temperature of the sample, reaches the predefined temperature, the carriage is moved on the rails (712) out of the tank (102). The frozen samples are then taken out of the carriage, and fresh samples of the organic product are placed on the shelves of the carriage, before introducing the carriage again into the tank, for freezing the fresh samples. A process of freezing an organic product using the freezing device of FIG. 1 is explained in reference to FIG. 4.

Figure 4:
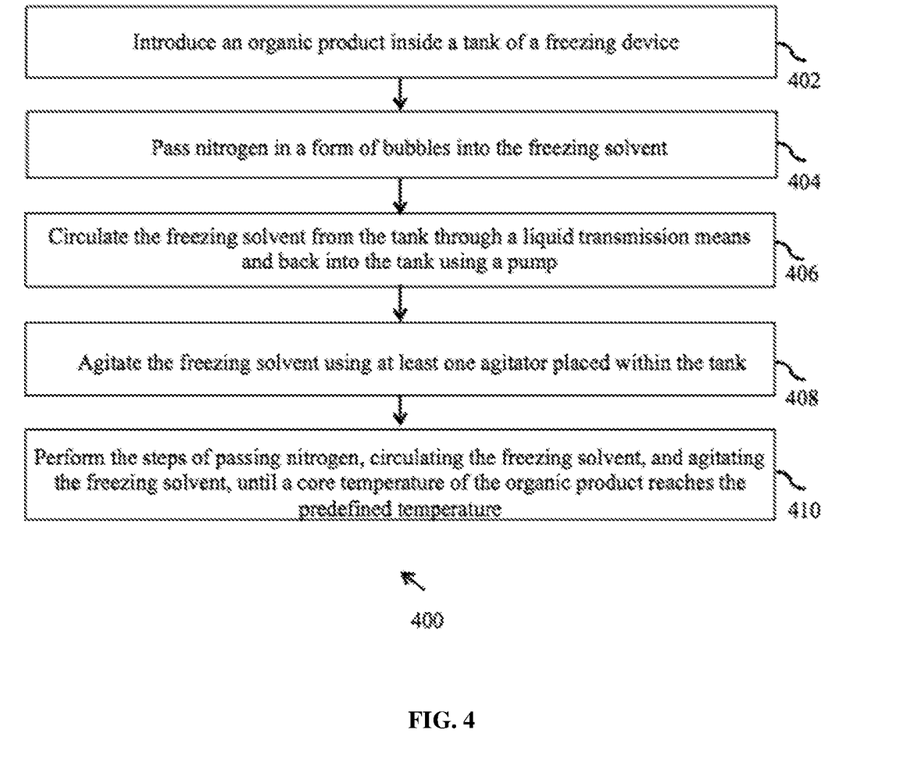
FIG. 4 is a flowchart of a method for freezing an organic product, in accordance with an embodiment of the present invention.

FIG. 4 is a flowchart 400 illustrates steps of the process of freezing an organic product (e.g. 144a as shown in FIG. 1) using a freezing device (e.g. 100 of FIG. 1).

At 402, the organic product is introduced inside a tank of the freezing device. The tank contains a freezing solvent set at a predefined temperature (−40 to −195 degree Celsius). The freezing solvent is at least one of an alcohol based solution and an aqueous solution comprising at least one inhibitor. For example, freezing solvent can be an aqueous solution of ethanol with the at least one inhibitor selected from Polysorbate 80, monoacyl glycerol, octyl glucoside sodium chloride (NaCl), and/or calcium chloride (CaCl), in a ratio of 10:1.

A temperature of the freezing solvent is set to the predefined temperature prior to introducing the organic product by using a cooling unit coupled to the tank. The cooling unit includes coils that circulate a refrigerant to cool the tank to the predefined temperature. Further, nitrogen is passed in one of a gaseous, a liquid form and a combination thereof through at least one inlet port of the tank into the freezing solvent to bring the temperature of the freezing solvent to the predefined temperature.

During introduction usually, the organic product is at a temperature higher than the predefined temperature. Hence, upon introduction of the organic product, the temperature of the freezing solvent tends to increase by a process of convection occurring between the organic product and the freezing solvent. In order to maintain the temperature at the predefined temperature, the steps 404 to 408 are performed continuously until a core temperature of the organic product reaches the predefined temperature.

At 404, nitrogen is passed in a form of bubbles into the freezing solvent by using a gas permeable structure placed inside the tank. In an embodiment, the nitrogen is provided to the gas permeable structure in a gaseous form, a liquid form, or a combination thereof through at least one inlet port of the tank. The form of the nitrogen is selected based on the predefined temperature. In an embodiment, the nitrogen is provided in the liquid form when the temperature of the freezing solvent and the predefined temperature is in a range of −160 to −195 degree Celsius, and the nitrogen is provided in the gaseous form, the liquid form or a combination thereof when the temperature of the liquid and the predefined temperature is in a range of −40 to −160 degree Celsius.

At 406, the freezing solvent is circulated from the tank, through a liquid transmission means and back into the tank using a pump to maintain the freezing solvent at the predefined temperature. In an embodiment, the liquid transmission means and the pump are coupled externally to the freezing tank.

At 408, the freezing solvent is agitated using at least one agitator placed within the tank to break one or more heat layers around the organic product.

At 410, the steps of passing nitrogen, circulating the freezing solvent, and agitating the freezing solvent, viz. steps 404 to 408, are performed until a core temperature of the organic product reaches the predefined temperature. When the core temperature of the organic product reaches the predefined temperature, the steps 404-408 are ceased, and the organic product is removed from the tank and stored at −40 degree Celsius in an refrigeration unit. An illustrative process of freezing the organic products is explained with reference to FIGS. 5A-5B.

Figure 5A:
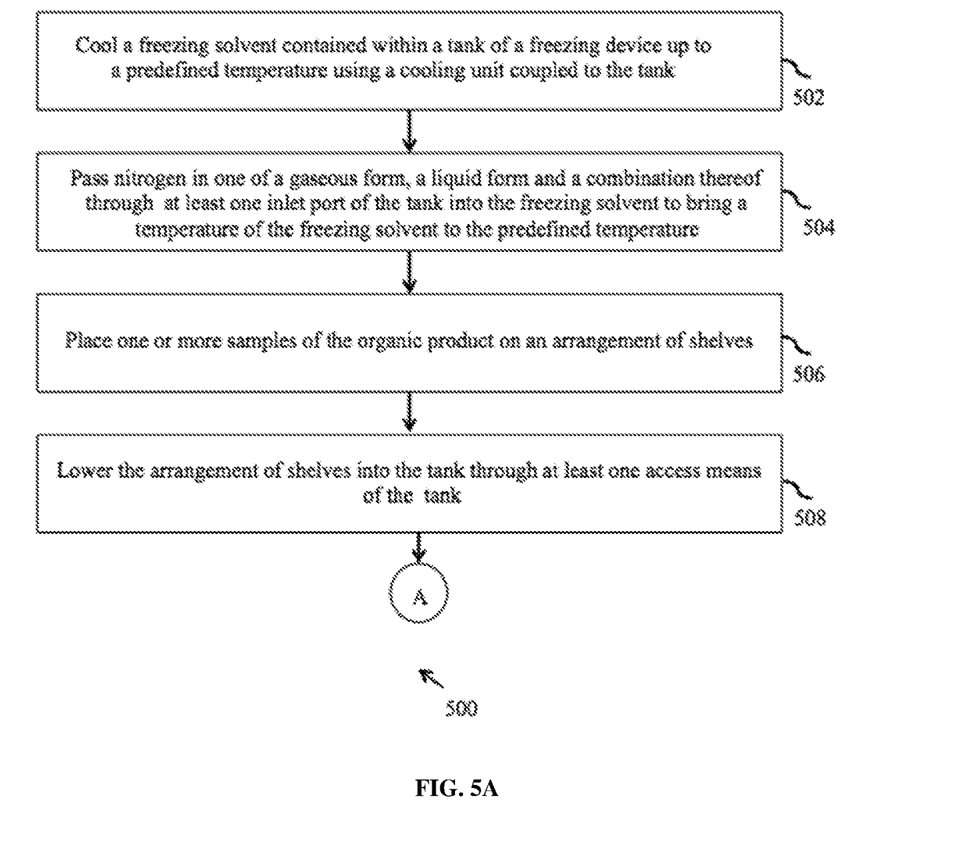
FIGS. 5A-5B is a flowchart of a method for freezing an organic product, in accordance with an embodiment of the present invention.
Figure 5B:
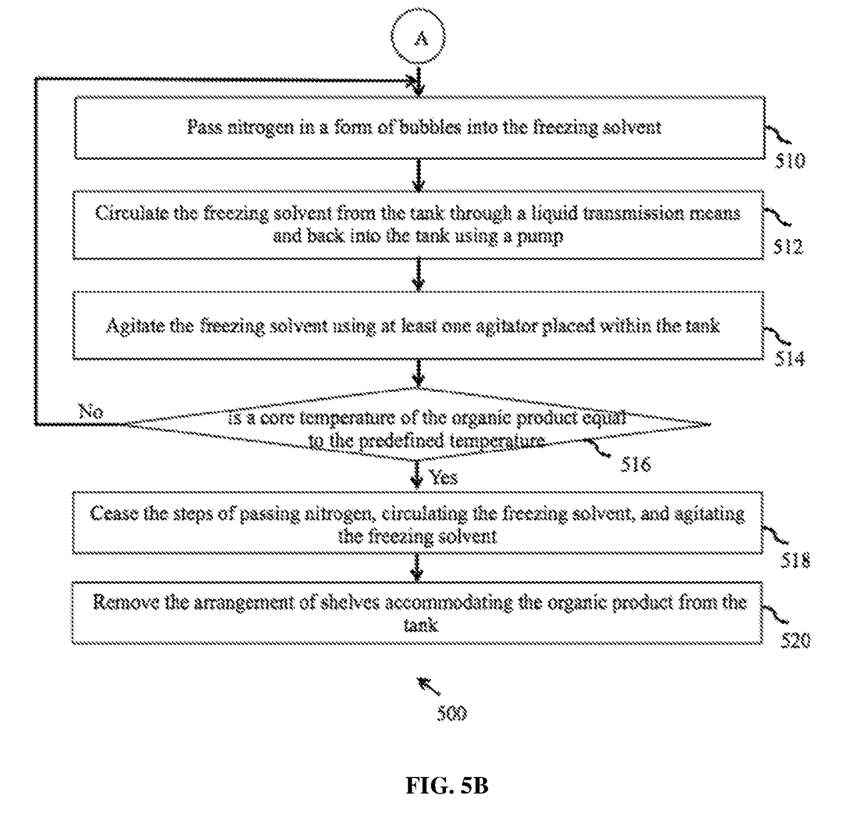

FIGS. 5A-5B is a flowchart 500 illustrating a process of freezing an organic product in accordance with another embodiment of the present invention.

At 502, a freezing solvent contained within a tank of a freezing device is cooled up to a predefined temperature by using a cooling unit. In an embodiment, the cooling unit is a plurality of condensers or cooling coils that carry a refrigerant and surround the tank, to cool the tank and the freezing solvent contained inside the tank up to the predefined temperature.

At 504, nitrogen is passed in one of a gaseous form, a liquid form and a combination thereof through at least one inlet port of the tank into the freezing solvent to bring a temperature of the freezing solvent to the predefined temperature. The passing of nitrogen and the cooling unit together facilitate reduction of the temperature of the freezing solvent at a faster rate.

At 506, one or more samples of the organic product are placed on one or more shelves of an arrangement of shelves.

At 508, the arrangement of shelves in lowered into the tank through at least one access means (e.g. a door or an opening at a top of the tank) of the tank. In an embodiment, a pulley arrangement coupled to a metal frame of the arrangement of shelves is used to lower the arrangement of shelves, into the tank.

At 510, nitrogen is passed in a form of bubbles into the freezing solvent using a gas permeable structure placed inside the tank. In an embodiment, the nitrogen is provided to the gas permeable structure in a gaseous form, a liquid form, or a combination thereof through at least one inlet port of the tank. The form of the nitrogen is selected based on the predefined temperature.

At 512, the freezing solvent is circulated from the tank, through a liquid transmission means and back into the tank using a pump to maintain the freezing solvent at the predefined temperature. In an embodiment, the liquid transmission means and the pump are coupled externally to the freezing tank.

At 514, the freezing solvent is agitated using at least one agitator placed within the tank to break one or more heat layers around the organic product.

At 516, if a core temperature of the organic product is equal to the predefined temperature, then the process flows to step 518, and if the core temperature of the organic product is still no t reaches the predefined temperature the process flows to step 510.

At 518, the steps of passing nitrogen, circulating the freezing solvent and agitating the freezing solvent, viz. steps 510 to 514, are ceased.

At 520, the arrangement of shelves accommodating the organic product is removed from the tank. In an embodiment, the pulley arrangement is used to lift the arrangement of shelves from the tank, through the at least one access means.

Aforesaid illustrations, describe an effective means of freezing organic products at low temperatures viz. −40 to −195 degree Celsius. An advantage of disclosed process of freezing is uniform freezing of the organic products in a relatively short span of time. For example, it takes approximately 60 minutes to freeze 25 kilograms (kgs) of grouper fish from −2 degree Celsius to −120 degree Celsius, using 300 liters of ethanol solution with alcohol based surfactants such as Polysorbate 80, monoacyl glycerol, octyl glucoside, sodium chloride (NaCl), and/or calcium chloride (CaCl) within the disclosed freezing device. In an embodiment, a ratio of ethanol to the alcohol based surfactants is 10:1. Aforementioned span of time, in freezing the organic products is relatively low in comparison to existing freezing processes. Freezing organic products at disclosed low temperature in such short span of time is advantageous in freezing plants involved in freezing large quantities of organic products.

Another advantage of disclosed freezing process, is the water molecules in the organic product get immovable/ stationary at such low temperatures. As a result, post the freezing process, the organic products can be stored at relatively higher freezing temperatures (e.g. −20 to −35 degree Celsius) without a risk of developing freezer burns. Further, a shelf life of the organic products achieved by disclosed process of freezing is 36 months. Further, food products (e.g. fish fillets) frozen by the disclosed process do not undergo drip loss when thawed. Consequently an improved quality of the frozen organic products is achieved by practicing the present invention.

I claim:

1. A process for freezing an organic product using a freezing device, the process comprising:
   introducing the organic product inside a tank of the freezing device, wherein the tank contains a freezing solvent set at a predefined temperature, wherein the organic product is at a temperature higher than the predefined temperature, and wherein the freezing solvent is at least one of an alcohol based solution and an aqueous solution comprising at least one inhibitor;
   passing nitrogen in a form of bubbles into the freezing solvent by using a gas permeable structure placed inside the tank, wherein nitrogen is provided to the gas permeable structure in one or more of a gaseous form, a liquid form, and a combination thereof through at least one inlet port of the tank, wherein a form of the nitrogen is selected based on the predefined temperature, and wherein the predefined temperature is selectable from −40 to −195 degree Celsius;
   circulating the freezing solvent from the tank, through a liquid transmission means and back into the tank using a pump to maintain the freezing solvent at the predefined temperature, wherein the liquid transmission means and the pump are coupled externally to the freezing tank; agitating the freezing solvent using at least one agitator placed within the tank; and
   performing passing of nitrogen, circulating the freezing solvent, and agitating the freezing solvent, until a core temperature of the organic product reaches the predefined temperature.

2. The process of claim 1, further comprising:
   cooling the freezing solvent contained within the tank by at least one cooling unit coupled to the tank; and
   passing nitrogen in one of a gaseous, a liquid form and a combination thereof through the at least one inlet port of the tank into the freezing solvent to bring the temperature of the freezing solvent to the predefined temperature, prior to introducing the organic product into the freezing tank.

3. The process of claim 1, wherein introducing the organic product inside the tank further comprises:
   placing one or more samples of the organic product on an arrangement of shelves, wherein each sample of the one or more samples on a shelf of the arrangement of shelves is spaced at a predefined distance from another sample on the shelf of the arrangement of shelves, wherein each shelf of the arrangement of shelves is provided with a plurality of holes to facilitate flow of the freezing solvent onto a sample placed on each shelf of the arrangement of shelves; and
   lowering the arrangement of shelves into the tank through the at least one access of the tank.

4. The process of claim 1, further comprising:
   ceasing the passing of nitrogen, circulating the freezing solvent, and agitating the freezing solvent when the core temperature reaches the predefined temperature; and removing the organic product from the tank, upon ceasing the passing nitrogen, circulating the freezing solvent, and agitating the freezing solvent.

5. The process of claim 1, wherein the tank is a double walled tank insulated with a foam material.

6. The process of claim 1, wherein the freezing solvent is a dehydrated ethanol solution having a low surface tension.

7. The process of claim 1, wherein the at least one inhibitor is selected from a group of non-ionic surfactants, and antifreeze additives.

8. The process of claim 1, wherein the freezing solvent is an aqueous solution of ethanol, and wherein the at least one inhibitor is selected from a group consisting of Polysorbate 80, monoacyl glycerol, octyl glucoside, sodium chloride (NaCl), and calcium chloride (CaCl), and wherein a proportion of the ethanol to the at least inhibitor is 10:1.

9. The process of claim 1, wherein the predefined temperature of the organic product sample is selected based on a water and a fat content of the organic product.

10. The process of claim 1, wherein the gas permeable structure is selected from a group consisting of a bubble generator, a nano membrane, and a sparger based on a form of nitrogen provided through the at least one inlet port.

11. The process of claim 1, wherein the organic product is selected from the group consisting of fish, meat, vegetables, fruits, roots, seeds, microbes, fungi and blood plasma.

12. The process of claim 1, wherein the process further comprises isolating the organic product from the freezing solvent by sealing the organic product in at least one of a gas permeable bag and a high barrier bag.

13. The process of claim 1, wherein the agitator is selected from the group consisting of fan, screw-type and helical agitators, wherein a speed of the agitator, is selected based on a viscosity of the freezing solvent, and wherein the speed is selected in a range of 1 to 500 rpm.

14. A freezing device to freeze an organic product, the freezing device comprising:
a tank having at least one access means through which the organic product is introduced into the tank, wherein the at least one access means is adapted to be opened for introducing the organic product, wherein the tank is configured to contain a freezing solvent maintained at a predefined temperature, wherein the freezing solvent is at least one of an alcohol based solution, and an aqueous solution comprising at least one inhibitor;
at least one inlet of the tank to permit the freezing solvent to flow inside the tank;
at least one outlet of the tank to permit the freezing solvent to flow out of the tank;
at least one liquid transmission means coupled to a pump to circulate a stream of the freezing solvent between the at least one inlet and the at least one outlet; and
at least one agitator, suspended within the freezing solvent, and adapted to rotate for agitating the freezing solvent and breaking one or more layers of heat around the organic product;
a gas permeable structure placed inside the tank to pass nitrogen in a form of bubbles into the freezing solvent, wherein the gas permeable structure is coupled to at least one inlet port of the tank that receives nitrogen in one of a gaseous form and a liquid form, based on a temperature of the freezing solvent and the predefined temperature, wherein the at least one inlet port is connected to a reservoir containing nitrogen; and
a controller configured to:
control an opening of the at least one inlet port to facilitate a flow of nitrogen in the liquid form when the temperature of the freezing solvent and the predefined temperature is in a range of −160 to −195 degree Celsius; and
control the opening of the one or more inlet ports to facilitate the flow of nitrogen in the gaseous form, the liquid form and a combination thereof when the temperature of the freezing solvent and the predefined temperature is in a range of −40 to −160 degree Celsius.

15. The freezing device of claim 14, wherein the gas permeable structure is a sparger when the nitrogen is passed in the liquid form, and wherein the gas permeable structure is one of a bubble generator and a nano membrane when the nitrogen is passed in the gaseous form.

16. The freezing device of claim 14, further comprising:
a displaceable carriage arrangement comprising a plurality of carriages connected to each other using a metal wire, and a pair of rails for transferring the plurality of carriages in and out of the tank through the at least one access means, wherein each carriage comprises at least one shelf for accommodating one or more samples of the organic product, wherein the displaceable carriage arrangement contains the freezing solvent and is placed inside the tank.

17. The freezing device of claim 14, wherein the tank is a double walled tank comprising an inner wall and an outer wall, wherein an inner wall is surrounded with cooling coils adapted to circulate a refrigerant to maintain a space contained by the inner wall at the predefined temperature, wherein the freezing solvent is contained in the space, and wherein the double walled tank is insulated with a semi rigid foam material disposed between the inner wall and an outer wall.

18. The freezing device of claim 14, wherein the at least one access means is a closeable opening provided at a top of the tank, wherein the at least one access means is adapted to be closed by sliding a sealable lid such as to cover the at least one access means completely, and wherein the at least one access means is adapted to be opened by sliding the sealable lid into an open position that exposes the inside of the tank through the at least one access means.

19. The freezing device of claim 14, further comprising wherein the controller is further configured to: operate the pump to circulate the freezing solvent from the at least one inlet, through the at least one liquid transmission means to the at least one outlet; control an opening of the at least one inlet and the at least one outlet using one or more electromechanical valves provided within the at least one inlet and the at least one outlet to permit flow of the freezing solvent through the at least one inlet and the at least one outlet respectively; operate the at least one agitator at a predefined speed; until a core temperature of each sample reaches the predefined temperature.

20. The freezing device of claim 19, wherein the controller is configured to select the predefined speed based on a viscosity of the freezing solvent, and wherein the predefined speed is selected in a range of 1 to 500 rotations per minute (rpm).

21. The freezing device of claim 14, wherein the at least one agitator is selected from the group consisting of fan, screw-type and helical agitators.

22. The freezing device of claim 21, wherein the inner wall and the outer wall are made of at least one of a metallic material and a moldable material.

* * * * *